D. L. LINDQUIST.
ALTERNATING CURRENT CONTROLLING MEANS.
APPLICATION FILED JUNE 21, 1905.
937,617.
Patented Oct. 19, 1909.
5 SHEETS—SHEET 1.
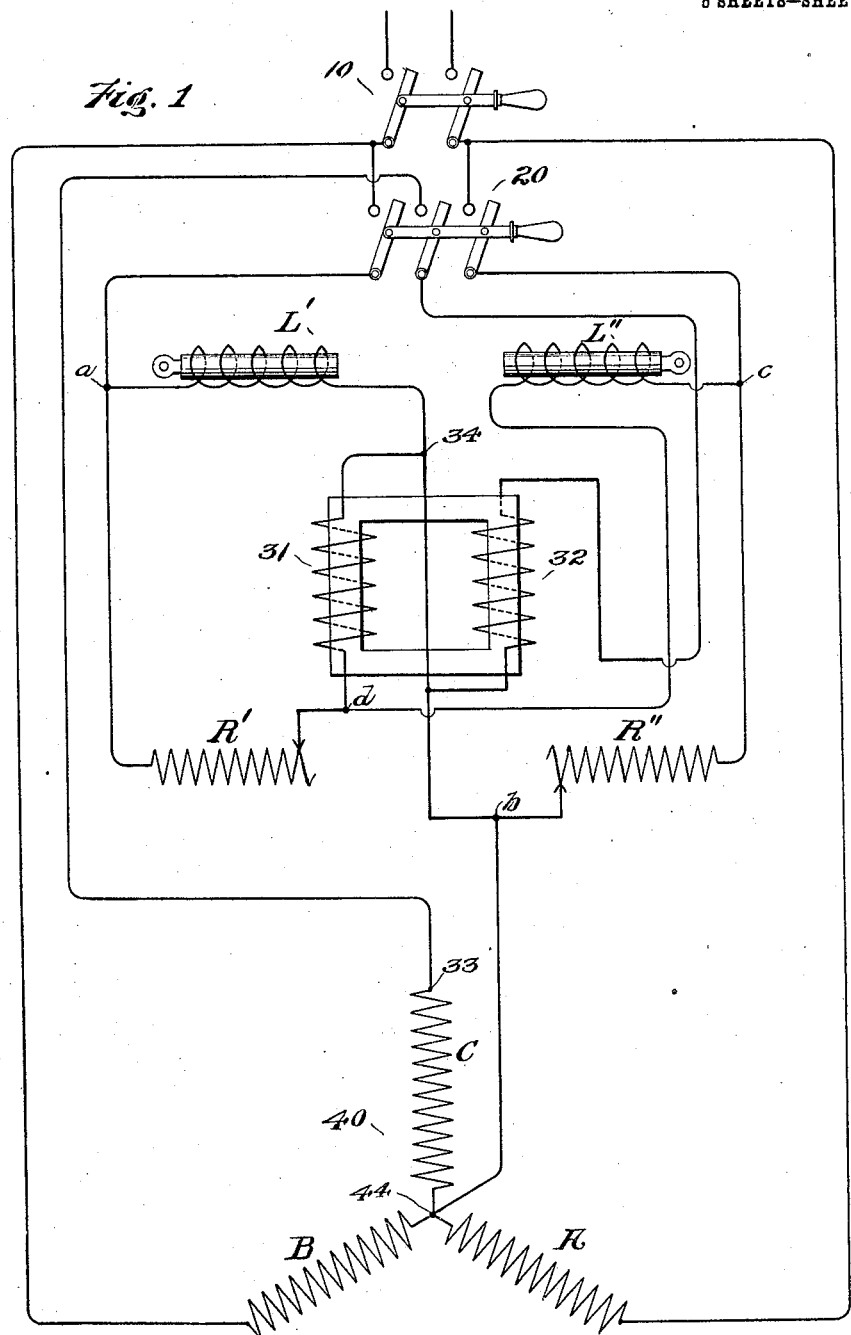
WITNESSES:
Henry E. Kirby
Walter C. Strang
INVENTOR
David L. Lindquist
BY
Charles M. Nissen
ATTORNEY D. L. LINDQUIST.
ALTERNATING CURRENT CONTROLLING MEANS.
APPLICATION FILED JUNE 21, 1905.
937,617.
Patented Oct. 19, 1909.
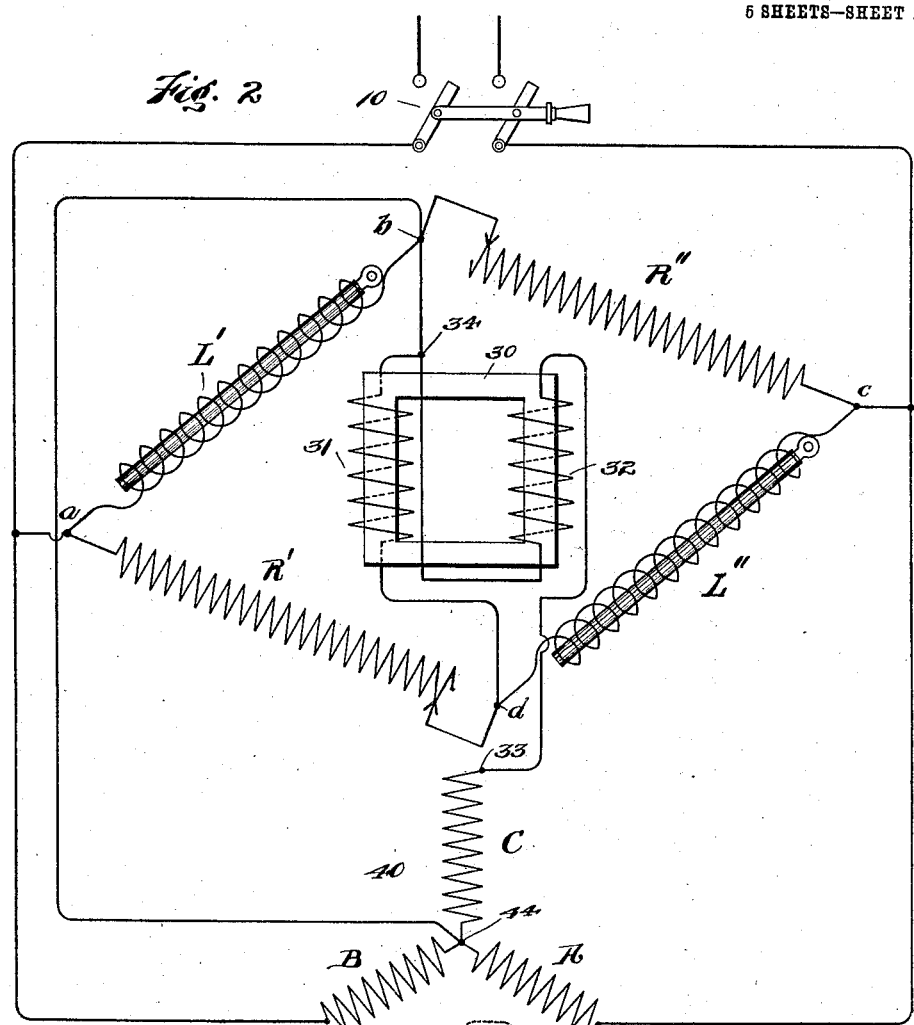
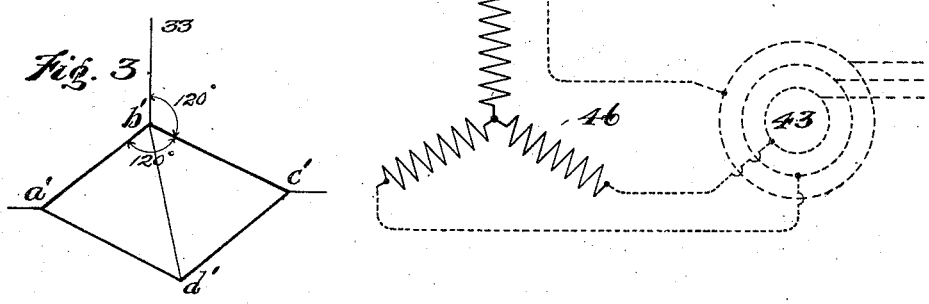
WITNESSES:
Henry E. Kirby
Walter C. Strang
INVENTOR
David L. Lindquist
BY
Charles M. Nissen
ATTORNEY

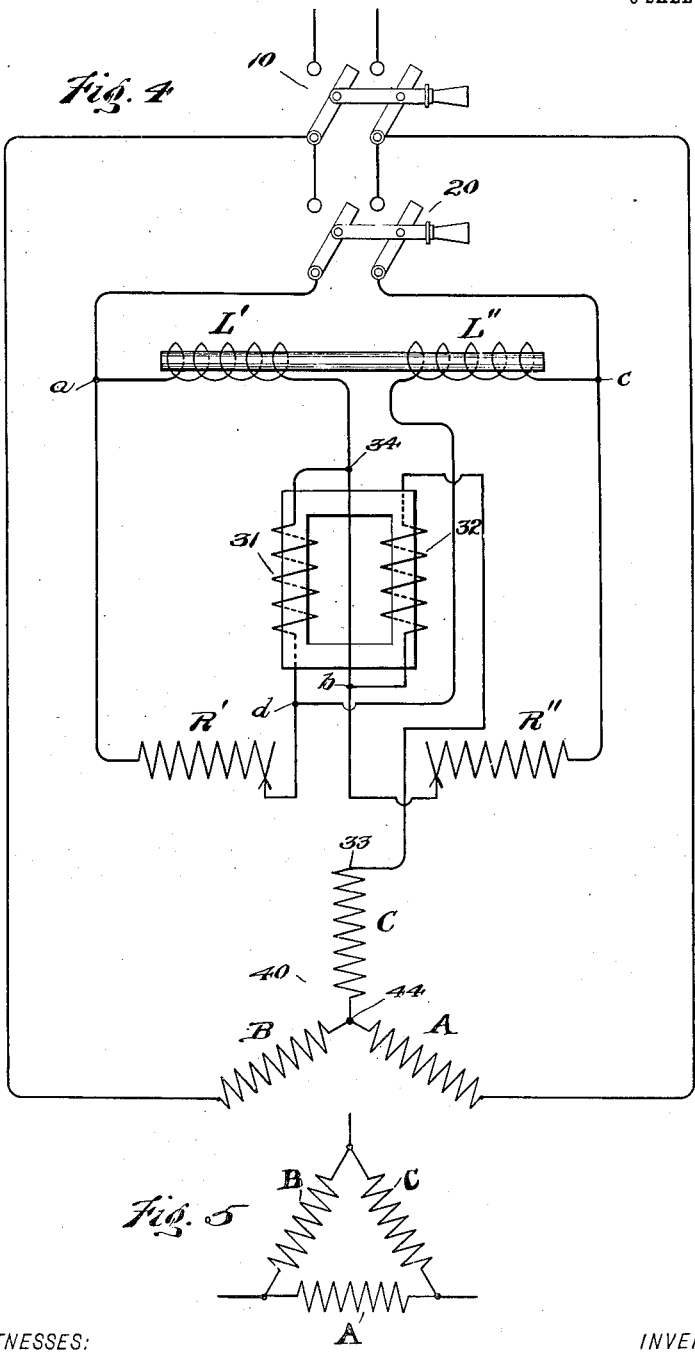

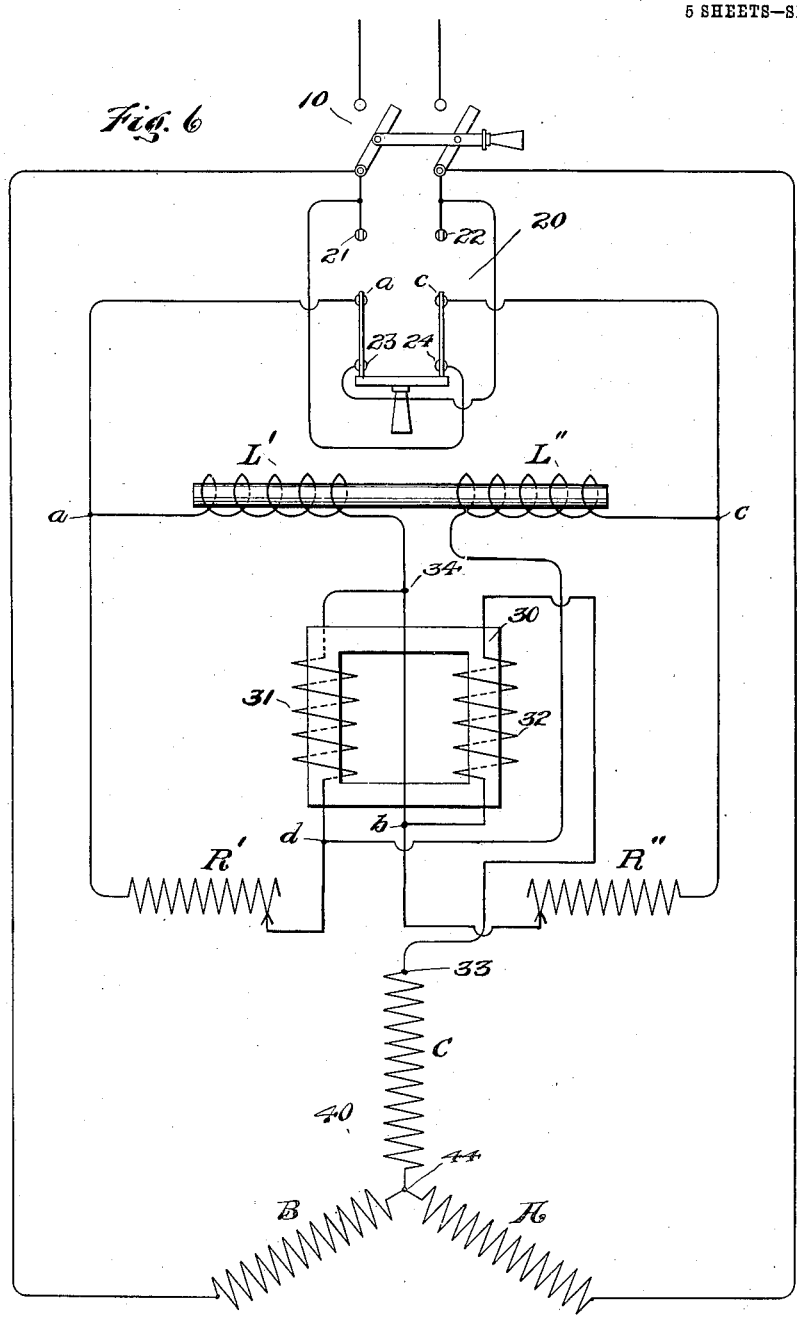

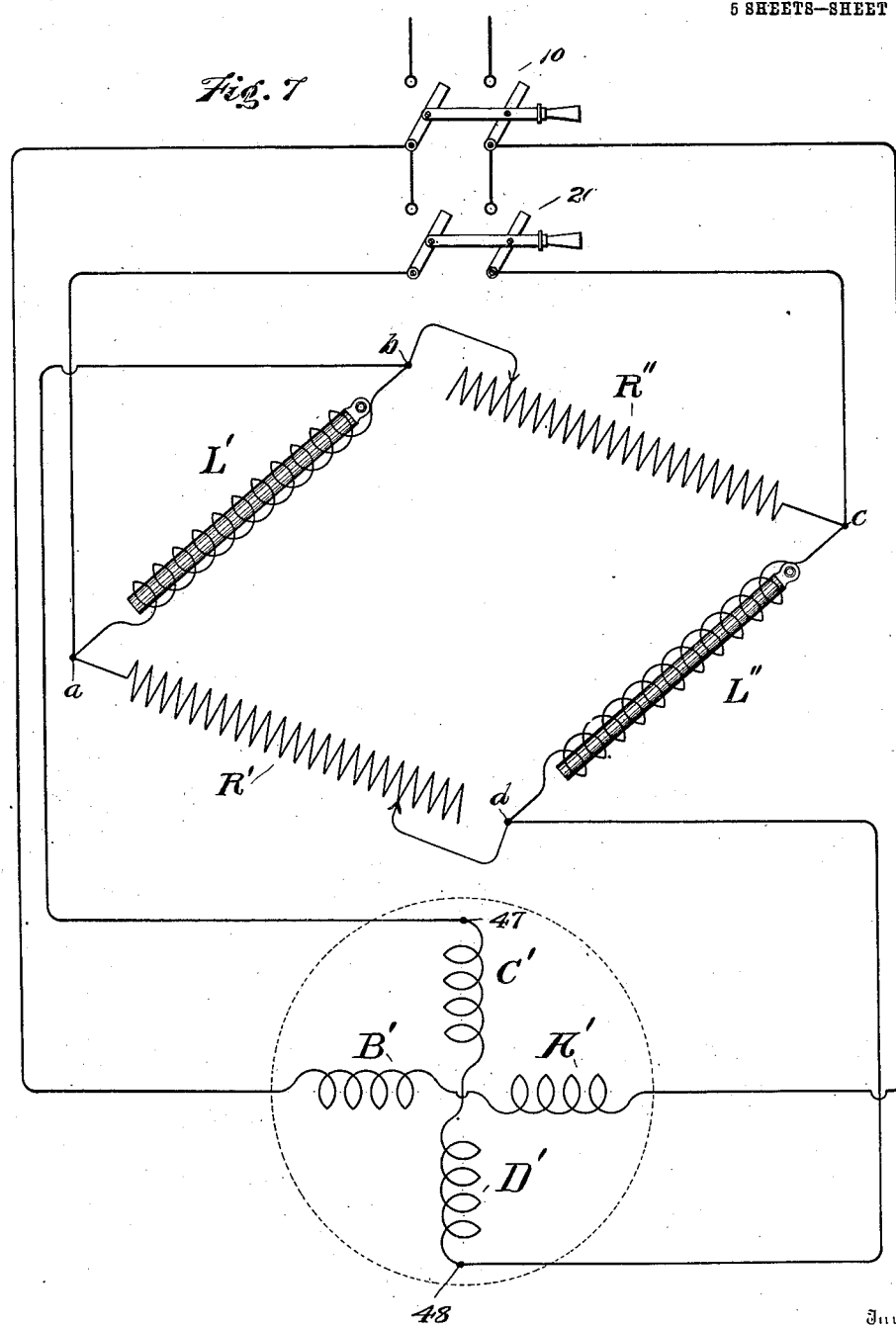

UNITED STATES PATENT OFFICE.

DAVID L. LINDQUIST, OF YONKERS, NEW YORK, ASSIGNOR TO OTIS ELEVATOR COMPANY, OF JERSEY CITY, NEW JERSEY, A CORPORATION OF NEW JERSEY.

ALTERNATING-CURRENT-CONTROLLING MEANS.

937,617.            Specification of Letters Patent.       Patented Oct. 19, 1909.

Application filed June 21, 1905. Serial No. 266,211.

*To all whom it may concern:*

Be it known that I, DAVID L. LINDQUIST, a subject of the King of Sweden and Norway, residing at Yonkers, in the county of Westchester and State of New York, have invented a new and useful Improvement in Alternating-Current-Controlling Means, of which the following is a specification.

This invention relates to alternating current controlling apparatus and has for its object the provision of means for changing the line voltage to any desired value and phase difference.

A further object of the invention is to provide simple means for operating a multiphase alternating current motor with a single phase alternating current.

Another object of the invention is the provision of simple and efficient means for starting an induction motor with a single phase alternating current.

The invention consists substantially in the construction, combination, location and relative arrangement of parts, all as will be more fully hereinafter set forth, as shown in the drawings accompanying this specification, and finally pointed out in the appended claims.

Referring to the accompanying drawings, Figure 1 is a view illustrating diagrammatically an arrangement of apparatus and circuits for starting an induction motor from a single phase alternating current circuit, and embodying the principles of my invention. Fig. 1 also illustrates means for operating a multiphase alternating current magnet from a single phase circuit. Fig. 2 is a similar view of the parts somewhat differently arranged to illustrate diagrammatically the voltage in the various circuits of the system, and also the adjustability of the parts. Fig. 3 is a voltage diagram illustrating the operation of the device. Fig. 4 is a view similar to Fig. 1 and illustrates the application of a starting device embodying the principles of my invention to a regular three-phase motor employing three leads to a Y or star connected primary of the motor. Fig. 5 is a view illustrating in diagram a mesh or delta connected motor primary which may be substituted for the star-connected primary shown in Fig. 4. Fig. 6 is a view similar to Fig. 4 and illustrates the application of means for reversing the direction of rotation of the motor. Fig. 7 shows means for starting a quarter-phase alternating current motor or for operating a quarter-phase alternating current magnet.

In practical operation of induction motors supplied with single phase alternating current, difficulty has been experienced in starting the motor. Various devices have been proposed for accomplishing this result and for initially speeding up the motor until the speed thereof synchronizes, or substantially so, with the alternations of the current. Such devices, however, have not generally proven satisfactory, for the reason that in starting the motor, and especially under a load it is desirable to give to the motor a starting torque sufficiently able to handle the load imposed on it, whereas with any device heretofore employed for starting induction motors supplied with single phase alternating current, it has not been found practicable for the motor to develop the desired or required starting torque.

It is among the special purposes of my present invention to provide a starting device for induction motors supplied with single phase alternating current, whereby practically the same voltage is applied to the primary of the motor as would be the case if the primary of the motor were connected to a three phase alternating current circuit. In other words, it is my object to provide a starting device for an induction motor to which is supplied a single phase alternating current, whereby the motor is enabled to start up as any ordinary three phase motor, and consequently developing the desired or required amount of torque in starting.

It will be readily seen upon an inspection of my Patents No. 744,773, granted November 24, 1903, No. 733,550, granted July 14, 1903, and 779,432, granted January 10, 1905, that my invention is not limited to the starting of induction motors but may also be applied to the operation of polyphase magnets. Therefore, the star-connected windings shown in Figs. 1, 2, 4 and 6 may represent the windings of a polyphase electromagnet as well as the primary of an induction motor. So also in Fig. 7 the windings shown at right angles to each other may be those of a quarter-phase motor or of a quarter-phase electromagnet. The principle of operation in the primary of the induction motor and in the electromagnet is somewhat similar, the purpose in each case being to obtain a symmetrical or balanced load.

Although means are disclosed for changing a single phase line current to a substantially symmetrical polyphase current in the primary of an induction motor so that the motor will have a large torque at starting it is to be understood that the motor may be operated continuously in that way but it is preferable to operate the motor directly from only the single phase circuit after the motor has approached synchronism so as to reduce the consumption of current during operation of the motor. But in the operation of polyphase magnets it is intended to maintain the symmetrical polyphase current so as to reduce to a minimum the chattering of the magnet. It should be noted, however, that in the case of magnets it may sometimes be desirable to have its strength increased until its armature has been attracted to position after which less power is required to hold it in place. By means of my invention this may be accomplished in the same way as with an induction motor. The term "alternating current motor" as used in the claims is intended to cover any means operated by an alternating current which transforms electrical into mechanical power and should therefore be construed in its broadest sense.

The object of my invention may be accomplished in many specifically different ways. While, therefore, I have shown and will now describe various arrangements for accomplishing the desired objects, I do not desire to be limited or restricted thereto, as various other forms and changes in details thereof would readily suggest themselves to persons skilled in the art and still fall within the spirit and scope of my invention.

In the particular embodiment selected by me for purposes of illustration and the simplest and best way in which I have contemplated carrying the same into practical operation, I employ a transformer with the terminals of the primary and secondary thereof reversed in respect to each other. The secondary coil of the transformer being connected in circuit with one of the coils of the primary of the induction motor, while the primary of the transformer is so connected in circuit with inductance and resistance coils, that the voltage in the secondary of the transformer and, hence, also in one of the windings of the primary of the motor is in such phase relation in respect to the voltage in the other coils of the primary of the motor as that the motor will start in substantially the same way as any ordinary three phase motor.

Referring specifically to the arrangement shown in the accompanying drawings, reference number 10 designates a main line switch the function of which is to open and close the main line circuit and which, to this end, may be of any suitable arrangement and construction.

20 designates a starting switch which is designed to open and close the circuit through the starting device and to this end may be of any suitable or convenient construction.

The coils of the primary of an induction motor 40 are indicated by reference letters A, B, C. These coils may represent windings of a polyphase electromagnet, however, as is apparent from the patents hereinbefore referred to.

Arranged to be connected across the mains I have shown an adjustable bridge of inductances and resistances with a transformer connected across intermediate points of the bridge. The inductance coil L' is placed in series with the resistance R'' across the line and the resistance R' in series with the inductance L'', the inductance L' being connected to the resistance R' at one of the bridge terminals $a$ and the resistance R'' being connected to the inductance L'' at the other bridge terminal $c$. The transformer 30 has its primary 31 connected between the intermediate points $b$ and $d$ of the bridge. The lower terminal of the secondary 32 of the transformer is connected at 34 to the primary 31 and is placed in series with one of the coils C of the primary of the induction motor 40.

In practice, the inductance coils L' and L'' are preferably constructed with as little ohmic resistance as is practicable and they may be wound on separate cores, as shown in Fig. 1 or they may be wound upon a common core as shown in Figs. 4 and 6. The resistances R' and R'' are preferably adjustable as indicated by the sliding arrows and the inductances are made adjustable by providing the coils with movable cores. When there is a common core the coils may be made independently movable relatively to the core. The cores are preferably made of laminated iron or of bundles of iron wires. If desired, however, the inductance coils may be made without any cores. The resistances should be as nearly non-inductive as is practicable.

In Figs. 2 and 3 I have shown diagrammatically the connections of the primary and secondary coils of the transformer. The secondary coil of the transformer is included in circuit with one of the coils C of the primary of the motor and the primary coil has its terminals respectively connected across the series circuits of inductance L' and resistance R'' on the one side, and resistance R' and inductance L'' on the other side. The voltage across the inductance coil L', referring now to Fig. 3, may be represented both as to its amount and its direction by the line $a'$ $b'$. The voltage across the resistance R' may be in a similar manner represented by the line $a'$ $d'$ and the voltage across the inductance L" may be represented by the line $d'$ $c'$. The line between $b'$ and $d'$ in Fig. 3 will then represent the voltage between the points $b$ and $d$ in Fig. 2 both as to amount and direction. This is the voltage which is applied to the primary coil 31 of the transformer 30. It should be understood that current from the main line divides through the two series circuits of the bridge, one of said circuits including the inductance L' and resistance R" and the other of which includes the resistance R' and inductance L". At every alternate half cycle, the part of the current flowing through the circuit which includes the inductance L' and resistance R" in series is of higher potential at the point $b$ than the potential at the point $d$ of the part of the current flowing through the other series circuit including the resistance R' and inductance L". Therefore, an electrical pressure from the point $b$ toward the point $d$ is obtained by reason of the difference of potential at these points. But this pressure as indicated by the line $b'$ $d'$ in Fig. 3 is in the opposite direction to that desired in the phase winding C of the primary of the induction motor 40. To overcome this, a transformer is introduced as above explained with its primary terminals connected between the points $b$ and $d$ and its secondary terminals reversely connected at 34 to the primary and at 33 to the phase winding C of the motor. The terminal 34 is connected to the point $b$ and thence to the zero point 44 of the motor primary. The conditions are reversed at every succeeding half cycle so that during half a cycle the pressure is from $b$ to $d$ and during the next half cycle from $d$ to $b$ and then from $b$ to $d$ again, and so on, the result being a single phase current in the coil C but with the phase displaced with reference to that in the coils A and B. The voltage in the secondary will be opposite to that in the primary but by reason of the reverse connections the voltage will be applied in proper direction to the coil C. This voltage may be represented in amount and direction by the line $b'$ 33 (see Fig. 3), making approximately 120° with the line $b'$ $c'$ and also with the line $b'$ $a'$ so that the current fed to the motor shall be three phase and substantially symmetrical.

The operation of the starting device as above explained is as follows. The main switch 10 is closed thereby connecting one terminal of each of the phase coils B and A directly across the main line, the other terminals of said phase windings being connected to the zero point as shown at 44. The starting switch 20 (Figs. 1, 4 and 6) is now closed thereby completing the circuit through the bridge of resistances R', R" and inductances L', L", while at the same time the transformer circuit through the phase coil C is also completed. The primary of the transformer is now supplied with current and voltage obtained as above explained through the bridge arrangement of inductances and resistances. At any instant of time the direction of the voltage in the secondary is opposite to that in the primary but by reason of the reverse connections the voltage applied to the coil C will be in proper direction with respect to the voltages in phase windings A and B to produce a strong torque in starting the motor. The motor starts up in substantially the same way as if connected to an ordinary symmetrical three phase alternating current circuit, for the reason that the voltage obtained as above described in the circuit which includes the primary 31 of the transformer 30 is due to the bridge arrangement of the inductance coils and resistance coils and differs 90° in phase with respect to that supplied by the main line. In effect, this phase difference is a little more than 90° as indicated diagrammatically in Fig. 3 by the line $b'd'$, so that compensation sufficient to rectify this difference in the secondary of the transformer is secured by the lag in the transformer whereby the voltage in the secondary of the transformer will be 90° in phase from that of the main line, and by connecting the zero point 44 of the primary of the induction motor with the inductances and resistances as shown and above described the phase difference between the voltage applied to the phase winding C and either of the phase windings A or B becomes 120°. Thus it will be seen that the motor starts up in substantially the same way as an ordinary three phase motor and with the regular starting torque. After the motor has attained a certain speed, it is desirable to open the starting switch 20 so as to permit the motor to run on a single phase circuit. By opening the starting switch 20, I avoid the danger of loss of current through the bridge connected inductances and resistances.

In Fig. 4 an arrangement comprised within the spirit and scope of my invention is shown similar to the arrangement above described and as shown in Figs. 1 and 2. In this case, however, the zero point of the primary or phase windings of the motor is not connected directly to the starting device but the same results are secured. When the arrangement shown in Fig. 4 is employed the primary of the motor may be either star-connected as indicated at 40 or it may be delta-connected as indicated in Fig. 5.

It is obvious that a starting device such as above described may be employed in connection with means for reversing the direction of operation or rotation of the motor. In Fig. 6 I have shown a reversing switch arranged in association with my invention, and for the purpose of illustration I have shown the reversing switch employed in connection with the form of arrangement of circuits and connections such as is illustrated in Fig. 4. The starting switch in this case is so arranged that when it is thrown in one direction it completes circuit through the contacts 21 and 22, in which case the series circuits including the inductances and resistances as above explained will be connected to the main line in the same way as shown in Fig. 2, and the voltage will be supplied to the transformer and to the phase winding C of the motor in one direction to cause the motor to rotate in the corresponding direction. If, however, the starting switch is thrown to its other position, circuit is completed through contacts 23 and 24, thereby connecting the bridge of inductances and resistances in the opposite direction for current to flow in the opposite direction through the various arms of said bridge whereby the voltage supplied to the transformer and to the phase winding C of the motor will be in the direction opposite to that above described, so that the motor is thereby caused to rotate in the opposite direction.

It is obvious that the secondary of the motor may be of any suitable construction and arrangement, as for instance it may be phase wound as shown at 46 in Fig. 2, in which event any suitable or convenient arrangement of starting resistance may be included in its circuits as indicated at 43, Fig. 2.

It will be noted that the arms of the bridge are shown adjustable or variable. That is, the inductances L' and L'' may each be varied by changing the relative position of the coil and its core, and the resistances R' and R'' may be varied by cutting out more or less of the same. This is preferably so for the reason that a motor which is desired to be started may not be symmetrically wound. For instance, the phase winding C may require a larger or a smaller voltage than the other windings in order to obtain a substantially symmetrical relation between the different windings. Furthermore, a different phase variation may be desired. This can be done by adjusting the arms of the bridge until the proper voltage and phase difference is secured. So also in a quarter-phase motor or electromagnet, as illustrated in Fig. 7, the voltage in the coils C', D' having the terminals 47, 48 may be varied by means of the adjustable arms of the bridge until the proper relation is secured as to the windings A', B'. In other words, the bridge being always unbalanced to obtain a difference of potential between the points b and d, it may be unbalanced to different degrees to effect the desired change in voltage and phase to adapt a single phase circuit to unsymmetrical as well as symmetrical or balanced windings of a polyphase motor.

It is obvious that many and various other modifications, variations, and changes, in details in the construction and arrangement of the features of my invention may readily occur to a person skilled in the art to which my invention relates. I do not desire, therefore, to be limited or restricted to the exact constructions or arrangements of parts herein described, but Having now set forth the object and nature of my arrangements and various constructions embodying the principles thereof, what I claim as new and useful and of my own invention is:

1. The combination with an alternating current circuit, of a motor connected to receive current from said circuit, means for varying the voltage applied to the motor to any desired value and phase difference, said means comprising inductance and resistance connected to receive current from said circuit, of a transformer having a primary connected to receive a portion of the current flowing through said inductance and resistance, and a secondary connected to supply current to said motor.

2. The combination with a line circuit of a single phase alternating current system, of a motor connected to receive current from the line circuit, inductance and resistance connected to receive current from the line circuit, a transformer having a primary connected to receive a portion of the current flowing through said inductance and resistance, and connections between the motor and the secondary of the transformer.

3. The combination with a line circuit of a single phase alternating current system, of a polyphase motor having a portion of its winding connected to the line circuit, and phase changing means comprising inductance and resistance connected to the line circuit, and a transformer having a primary connected to receive a portion of the current through said inductance and resistance, and a secondary connected to supply current to the motor.

4. The combination with a line circuit of an alternating current system, of a parallelogram bridge of inductances and resistances, a transformer having a primary winding parallel with a portion of said bridge, a motor connected to said line circuit, and circuits and connections for varying the voltage supplied to a portion of the windings of said motor to any desired value or phase difference.

5. The combination with a line circuit for a single-phase alternating current, of an induction motor having a portion of the phase windings thereof connected across the line circuit, a starting device connected across the line circuit and including a transformer and inductance and resistance in circuit with the primary of the transformer, and connections between the transformer and the other phase windings of the motor.

6. The combination with a line circuit, of an induction motor having a portion of the phase windings of the primary thereof included in the line circuit, a starting device, and means for connecting the same across the line circuit, said starting device including a transformer and inductance and resistance in the primary and connections to the secondary windings of the transformer and another phase winding of the motor primary.

7. The combination with a line circuit and an induction motor having a portion of the phase windings thereof included in said circuit, of a starting device, means for connecting the same into and out of the line circuit, said starting device including a transformer and inductance and resistance in the primary of the transformer, the terminals of the windings of the primary and secondary of said transformer being reversed, the secondary of said transformer being connected in circuit with another of the phase windings of the motor.

8. The combination with a line circuit and an induction motor having a portion of the phase windings of the primary thereof included in the line circuit, of a starting device, means for connecting the same across the line circuit, said starting device including induction and resistance coils arranged in series, a transformer having the primary thereof connected to the series circuit of the induction and resistance coils, the secondary winding of the transformer connected in circuit with another of the phase windings of the induction motor.

9. The combination with a line circuit, of an induction motor having a portion of the phase windings of the primary thereof included in the line circuit, a starting device, and means for connecting the same across the line circuit; said starting device including sets of induction and resistance coils arranged in parallel and a transformer connected across the circuits of said sets of induction and resistance coils, the secondary of said transformer being connected in circuit with another of the phase windings of the primary of the motor.

10. The combination with a line circuit and an induction motor having a part of the phase coils of the primary thereof connected in the line circuit, of a starting device, means for connecting the same across the line circuit, said starting device including sets of induction and resistance coils, the induction and resistance coils of each set being in series with each other, said series circuits being in parallel with respect to each other, a transformer connected across said parallel circuits, and circuit connection between the transformer and another of the phase windings of the primary of the motor.

11. The combination with a line circuit and an induction motor having a portion of the phase windings of the primary thereof included in the line circuit, of a starting device, means for connecting the same across the line circuit, said starting device including circuits arranged in parallel in respect to each other, one of said parallel circuits including induction and resistance coils arranged in series, and the other of said parallel circuits including resistance and induction coils arranged in series, a transformer connected across said parallel circuits, and circuit connections between said transformer and another of the phase windings of the primary of the motor.

12. The combination with a line circuit and an induction motor having a portion of the phase windings of the primary thereof connected in line circuit, of a starting device including circuits in parallel with each other, one of said circuits including induction and resistance coils in series, and the other including resistance and induction coils in series, a transformer having its primary circuit connected across said parallel circuits, the secondary of the transformer being included in circuit with another of the phase windings of the motor, and means for connecting and disconnecting said parallel circuits across the main line.

13. The combination with a line circuit and an induction motor having a portion of the phase windings of the primary thereof included in said line circuit, of a starting device including a circuit having induction and resistance coils in series, a transformer having the primary thereof connected to said last mentioned circuit, the secondary of the transformer including another of the phase windings of the primary of the motor, and means for connecting and disconnecting said induction and resistance coils in circuit across the line circuit.

14. The combination with a main line circuit and an induction motor having a portion of the phase windings thereof included in said main line circuit, of a starting device including a bridging circuit, induction and resistance coils arranged in series in said bridging circuit, a transformer, circuit connections between said transformer and said bridging circuit, circuit connections between said transformer and one of the phase windings of the induction motor, and means for connecting and disconnecting said bridging circuit across the main line circuit.

15. The combination with a main line circuit and an induction motor having a portion of the phase windings thereof included in said main line circuit, of a starting device including a bridging circuit, induction and resistance coils arranged in series in said bridging circuit, a transformer, circuit connections between said transformer and said bridging circuit, circuit connections between said transformer and phase windings of the induction motor, means for connecting and disconnecting said bridging circuit across the main line circuit, and means for reversing the current through said bridging circuit.

16. In combination with a main line circuit and an induction motor having a portion of the phase winding of the primary thereof arranged in the line circuit, of a starting device including parallel bridging circuits, each of said bridging circuits including induction and resistance coils in series with each other, a transformer having the primary thereof connected across said parallel bridging circuits and between the induction and resistance coils of each of said parallel bridging circuits, the secondary of the transformer being connected in circuit with another of the phase windings of the motor.

In testimony whereof, I have signed my name to this specification in the presence of two subscribing witnesses.

DAVID L. LINDQUIST.

Witnesses:
CHARLES M. NISSEN,
WALTER C. STRANG.